United States Patent
Kim et al.

(10) Patent No.: US 9,906,824 B2
(45) Date of Patent: Feb. 27, 2018

(54) METHOD AND DEVICE FOR ALLOCATING MEDIA DATA TO A SUPERFRAME AND TRANSMITTING A SUPERFRAME IN WHICH A TIME LENGTH OF MEDIA DATA CORRESPONDS TO A TIME LENGTH OF THE SUPERFRAME IN A DIGITAL BROADCASTING SYSTEM

(71) Applicant: Electronics and Telecommunications Research Institute, Daejeon (KR)

(72) Inventors: Woo-Suk Kim, Daejeon (KR); Byungjun Bae, Daejeon (KR); Hyun-Jeong Yim, Daejeon (KR); Hyoungsoo Lim, Daejeon (KR); Namho Hur, Sejong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 15/066,934

(22) Filed: Mar. 10, 2016

(65) Prior Publication Data
US 2016/0269763 A1    Sep. 15, 2016

(30) Foreign Application Priority Data
Mar. 11, 2015 (KR) .................. 10-2015-0034072

(51) Int. Cl.
*H04N 21/242* (2011.01)
*H04N 21/438* (2011.01)
*H04L 1/00* (2006.01)
*H04H 20/42* (2008.01)
*H04N 21/61* (2011.01)
*H04N 21/845* (2011.01)
*H04N 21/2385* (2011.01)
*H04N 21/236* (2011.01)

(52) U.S. Cl.
CPC .......... *H04N 21/242* (2013.01); *H04H 20/42* (2013.01); *H04L 1/00* (2013.01); *H04N 21/2385* (2013.01); *H04N 21/23608* (2013.01); *H04N 21/4382* (2013.01); *H04N 21/6112* (2013.01); *H04N 21/8456* (2013.01)

(58) Field of Classification Search
None
See application file for complete search history.

(56) References Cited

U.S. PATENT DOCUMENTS

| | | | | |
|---|---|---|---|---|
| 8,009,685 | B2 * | 8/2011 | Himmanen | ........... H04L 12/56 370/410 |
| 2007/0291836 | A1 * | 12/2007 | Shi | ................ H04N 21/234381 375/240.01 |
| 2009/0219884 | A1 | 9/2009 | Kwon et al. | |
| 2010/0175096 | A1 | 7/2010 | Seo et al. | |

(Continued)

FOREIGN PATENT DOCUMENTS

| KR | 10-2009-0094599 A | 9/2009 |
|---|---|---|
| KR | 10-2015-0045891 A | 4/2015 |

*Primary Examiner* — Hoang Vu A Nguyen Ba
(74) *Attorney, Agent, or Firm* — William Park & Associates Ltd.

(57) ABSTRACT

Disclosed is a method and device for transmitting media data in a digital broadcasting system for allocating media data to a superframe, and transmitting a superframe in which a time length of media data corresponds to a time length of the superframe.

9 Claims, 6 Drawing Sheets

(56) References Cited

U.S. PATENT DOCUMENTS

| | | | |
|---|---|---|---|
| 2011/0002405 A1* | 1/2011 | Raveendran | H04H 60/41 375/260 |
| 2012/0005715 A1 | 1/2012 | Lee et al. | |
| 2014/0143440 A1* | 5/2014 | Ramamurthy | H04N 21/23439 709/231 |
| 2014/0185563 A1 | 7/2014 | Kwon et al. | |
| 2015/0113101 A1 | 4/2015 | Kim et al. | |
| 2015/0215924 A1 | 7/2015 | Kwon et al. | |

* cited by examiner

METHOD AND DEVICE FOR ALLOCATING MEDIA DATA TO A SUPERFRAME AND TRANSMITTING A SUPERFRAME IN WHICH A TIME LENGTH OF MEDIA DATA CORRESPONDS TO A TIME LENGTH OF THE SUPERFRAME IN A DIGITAL BROADCASTING SYSTEM

CROSS-REFERENCE TO RELATED APPLICATION

This application claims priority to and the benefit of Korean Patent Application No. 10-2015-0034072 filed in the Korean Intellectual Property Office on Mar. 11, 2015, the entire contents of which are incorporated herein by reference.

BACKGROUND OF THE INVENTION (a) Field of the Invention

The present invention relates to a method and device for transmitting media data in a digital broadcasting system.

(b) Description of the Related Art

Regarding next-generation broadcasting standards such as the digital video broadcasting (DVB)-T2, and the advanced television systems committee (ATSC) 3.0 that is currently undergoing the progress of standardization, a single broadcasting channel may be configured with a plurality of subchannels (e.g., physical layer pipes (PLP) in the DVB-T2 system) for independently performing modulation and channel coding, differing from the existing digital broadcasting standards based on the moving picture experts group (MPEG)-2 system. The difference may influence a method for loading a media stream on a broadcasting channel having a limited transmission bit ratio and complexity thereof.

The conventional digital broadcasting standard allows transmitting media through a multiplexed MPEG-2 transmission stream matching a limited transmission bit ratio of a broadcasting channel. Therefore, to compensate for a change of the transmission bit ratio of the input media, a null packet is inserted and the transmission bit ratio of the MPEG-2 transmission stream is fixed.

However, the next-generation broadcasting standard may not use the null packet in the MPEG-2 transmission stream so as to maximize transmission efficiency, and may support transmission of media data of an internet protocol (IP) in which it is difficult to guarantee a fixed transmission bit ratio. Hence, the respective subchannels of the next-generation broadcasting standard does not have a fixed transmission bit ratio so it is difficult to load the media stream on the broadcasting channel according to the conventional method. That is, when the broadcasting channel includes a plurality of subchannels with different transmission bit ratios, the subchannels need to be efficiently allocated to a restricted broadcasting resource (i.e., a transmission frame). Particularly, the broadcasting resource needs to be more efficiently allocated for the stream (e.g., video stream) in which it is difficult to anticipate a temporal change of the transmission bit ratio.

In addition, a data size of each frame is different in the case of a video stream configured with data having a constant time gap, so when the video stream is transmitted with reference to an average data rate of the stream, a transmission delay time of each frame is changed (that is, a delay jitter is generated). A receiving end of the broadcasting system must control a buffer and synchronize the time so as to compensate the change of a frame transmission delay time, and the buffer controlling and the time synchronization may become more complicated when there are a plurality of subchannels.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and device for transmitting media data using a transmission frame synchronized with reference to a time interval of media data when transmitting media through at least one subchannel included in a broadcasting channel.

An exemplary embodiment of the present invention provides a method for transmitting media data in a digital broadcasting system.

The method for transmitting media data includes: allocating the media data to a superframe; and transmitting the superframe to which the media data are allocated, wherein a time length of the superframe corresponds to a time length of the media data.

The superframe may include a future extension frame (FEF) on which the media data are not loaded, and at least one transmission frame on which the media data are loaded.

A summation of a time length of the at least one transmission frame and a time length of the FEF may correspond to a time length of the media data.

The superframe may include two transmission frames, and the media data may be video data of 30 frames per second (fps).

The superframe may include three transmission frames, and the media data may be video data of 60 frames per second (fps).

The allocating includes: dividing the media data into a plurality of partial media data; allocating the plurality of partial media data to a plurality of transmission frames included in the superframe based upon a time length of one of the plurality of partial media data; and configuring the plurality of transmission frames and a future extension frame (FEF) as a superframe.

Another embodiment of the present invention provides a device for transmitting media data in a digital broadcasting system. The device for transmitting media data includes: a frame configurer for allocating the media data to a superframe; and a transmitter for transmitting the superframe to which the media data are allocated, wherein a time length of the superframe corresponds to a time length of the media data.

The superframe may include: a future extension frame (FEF) on which the media data are not loaded, and at least one transmission frame on which the media data are loaded.

A summation of a time length of the at least one transmission frame and a time length of the FEF may correspond to a time length of the media data.

The superframe may include two transmission frames, and the media data may be video data of thirty frames per second (fps).

The superframe may include three transmission frames, and the media data may be video data of sixty frames per second (fps).

The device for transmitting media data further includes a media transmitter for dividing the media data into a plurality of partial media data, wherein the frame configurer allocates the plurality of partial media data to a plurality of transmission frames included in the superframe based upon a time length of one of the plurality of partial media data, and configures the plurality of transmission frames and a future extension frame (FEF) as a superframe.

Yet another embodiment of the present invention provides aDeletedTextsdevice for transmitting media data, including: at least one processor; a memory; and a radio frequency (RF) unit, wherein the at least one processor performs at least one program included in the memory to allocate the media data to a superframe and transmit the superframe to which the media data are allocated, and a time length of the superframe corresponds to a time length of the media data.

The superframe may include a future extension frame (FEF) on which the media data are not loaded, and at least one transmission frame on which the media data are loaded.

A summation of a time length of the at least one transmission frame and a time length of the FEF may correspond to a time length of the media data.

The superframe may include two transmission frames, and the media data may be video data of thirty frames per second (fps).

The superframe may include three transmission frames, and the media data may be video data of sixty frames per second (fps).

When performing the allocation, the at least one processor divides the media data into a plurality of partial media data, allocates the plurality of partial media data to a plurality of transmission frames included in the superframe based upon a time length of one of the plurality of partial media data, and configures the plurality of transmission frames and a future extension frame (FEF) as a superframe.

DETAILED DESCRIPTION OF THE EMBODIMENTS

Figure 1:
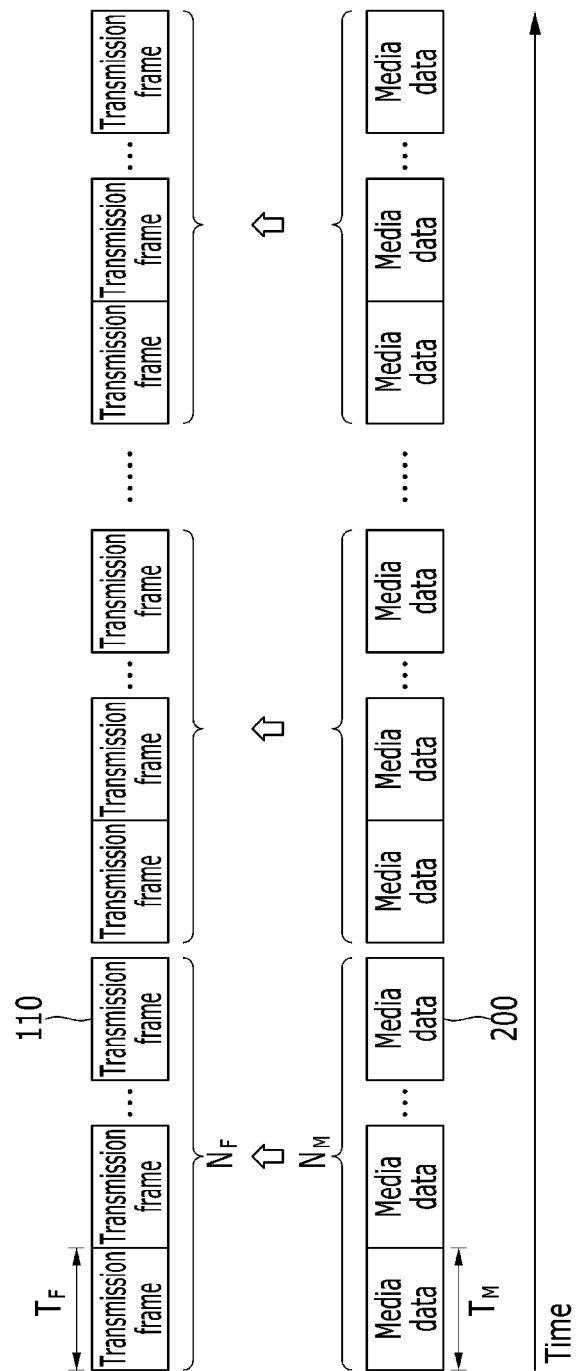
FIG. 1 shows a transmission frame and media data of a digital broadcasting system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, a mobile station (MS) may be designated as a terminal, a mobile terminal (MT), an advanced mobile station (AMS), a high reliability mobile station (HR-MS), a subscriber station (SS), a portable subscriber station (PSS), an access terminal (AT), user equipment (UE), and the like, and includes all or some functions of the MT, the MS, the AMS, the HR-MS, the SS, the PSS, the AT, the UE, and the like.

Further, a base station (BS) may be designated as an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) serving as the base station, a relay node (RN) serving as the base station, an advanced relay station (ARS) serving as the base station, a high reliability relay station (HR-RS) serving as the base station, small-sized base stations [a femto BS, a home node B (HNB), a home eNodeB (HeNB), a pico BS, a metro BS, a micro BS, and the like], and the like, and includes all or some functions of the ABS, the NodeB, the eNodeB, the AP, the RAS, the BTS, the MMR-BS, the RS, the RN, the ARS, the HR-RS, the small-sized base station, and the like.

FIG. 1 shows a transmission frame and media data of a digital broadcasting system according to an exemplary embodiment of the present invention.

Referring to FIG. 1, in a digital broadcasting system according to an exemplary embodiment of the present invention, a transmission frame 110 has a predetermined time length ($T_F$), one piece of media data 200 has a predetermined time interval ($T_M$), and the predetermined time length is a fixed value until its setting is changed. The media data 200 corresponds to video or audio data, and may be transmitted through a transmission frame 110 in the digital broadcasting system.

The broadcasting system according to an exemplary embodiment of the present invention synchronizes the times of the transmission frame 110 and the media data 200 by matching a time interval of a pack of consecutive transmission frames and a pack of consecutive media data ($N_F \times T_F = N_M \times T_M$). In an exemplary embodiment of the present invention, the DVB-T2 standard is described as a reference, and a broadcasting standard (e.g., ATSC 3.0) to which a future extension frame (FEF) 120 with a variable length may be applicable may also be applied. Further, the media data 200 according to an exemplary embodiment of the present invention is described with reference to video data, and it is also applicable to other types of media formats (e.g., audio or video including audio) that may be expressed as consecutive data with a predetermined time interval.

Figure 2:
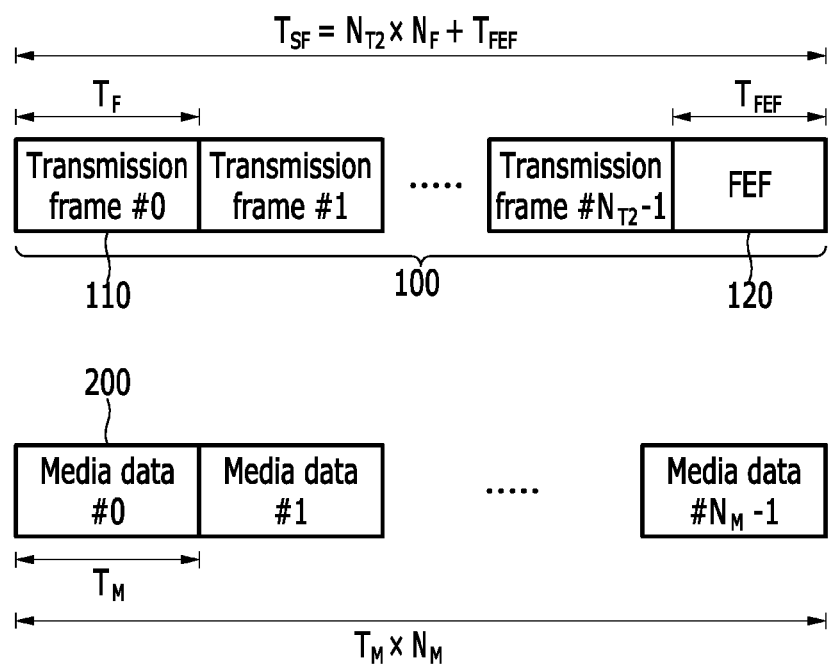
FIG. 2 shows a superframe and media data according to an exemplary embodiment of the present invention.

FIG. 2 shows a superframe and media data according to an exemplary embodiment of the present invention.

In an exemplary embodiment of the present invention, the superframe 100, a logical configuration unit, includes 2 to 255 T2 frames, and may include an FEF 120 for an additional extension. A time length of the transmission frame 110 may be determined by settings or limitations on the standards (e.g., an FFT size, a guard interval (GI), or a number of orthogonal frequency division multiplexing (OFDM) symbols).

A length $T_F$ of the transmission frame 110 may be determined by a number (K) of elementary periods (T) that are time intervals to be determined by a channel bandwidth. The length $T_F$ of the transmission frame 110 is expressed in Equation 1.

$$T_F = K \times T \qquad \text{(Equation 1)}$$

Here, K is an integer that is greater than 1, and may be determined by the standard of the digital broadcasting system or a user's settings. The length of the transmission frame 110 may not correspond to a time length ($N_M \times T_M$) of a media data pack.

In an exemplary embodiment of the present invention, the superframe 100 of the digital broadcasting system may further include an FEF 120 having a random time length to compensate a difference of the time length. In this case, the time length of the transmission frame pack and the superframe 100 including an FEF 120 corresponds to the time length of the media data pack.

Referring to FIG. 2, the FEF 120 is added to a rear of the transmission frame so the length of the superframe 100 corresponds to the length of the media data pack, which is expressed in Equation 2.

$$T_{SF}=N_{T2} \times T_F + T_{FEF} \quad \text{(Equation 2)}$$

A time length $T_{FEF}$ of the FEF 120 is expressed in Equation 3.

$$T_{FEF}=N_{FEF} \times T \quad \text{(Equation 3)}$$

Equation 2 may be expressed as Equation 4 by use of Equations 1 and 3.

$$T_{SF}=N_{T2} \times K \times T + N_{FEF} \times T \quad \text{(Equation 4)}$$

The time length $T_{SF}$ of the superframe 100 must correspond to the time length of the media data 200 that are divided into a plurality of pieces, so Equation 4 may be expressed as Equation 5.

$$N_M \times T_M = N_{T2} \times K \times T + N_{FEF} \times T \quad \text{(Equation 5)}$$

Regarding the digital broadcasting system according to an exemplary embodiment of the present invention, a variable ($N_{T2}$, K, or $N_M$) that may satisfy Equation 5 may be calculated prior to transmission of the media data 200. That is, when the standard of the media data 200 (e.g., a frame rate of the media data) is determined, the transmission frame 110 may be determined according to the determined standard. For example, the number $N_M$ of the media data 200 with a length $T_M$ may be determined and K, and $N_{T2}$ may be determined so that the length of the transmission frame 110 and the length of the transmission frame 110 included in the superframe 100 may be determined. A time length of the FEF 120 may be determined through the $N_{FEF}$ so as to match the time length of the $N_M$ media data 200 and the time length of the superframe 100. That is, the standard of the transmission frame 110 for transmitting the media data 200 and the time length of the FEF 120 may be determined to satisfy Equation 5.

The media data 200 may be allocated to the transmission frame 110 included in the superframe 100. Here, the media data 200 are not loaded on the FEF 120 included in the superframe 100.

A device for transmitting the media data 200 according to an exemplary embodiment of the present invention may transmit the transmission frame 110 of digital broadcasting synchronized with the time length of the media data pack.

Figure 3:
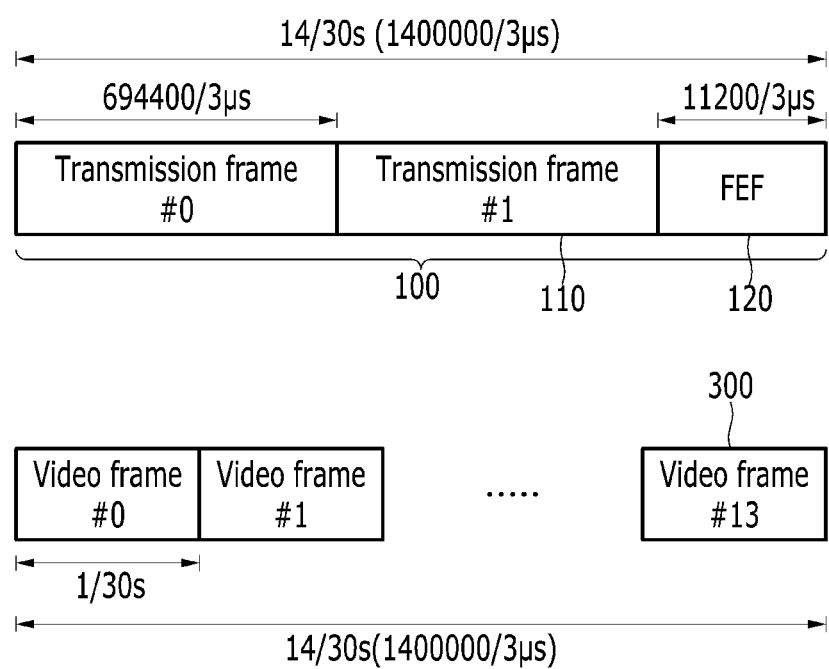
FIG. 3 shows a superframe according to an exemplary embodiment of the present invention, and media data synchronized to the superframe.

FIG. 3 shows a superframe according to an exemplary embodiment of the present invention, and media data synchronized to the superframe.

Referring to FIG. 3, the transmission frame 110 included in the superframe 100 includes 48 OFDM symbols, one superframe 100 includes two transmission frames 110, and the time length of each transmission frame is 694,400/3 µs. The time length of the FEF 120 included in the superframe 100 is 11,200/3 µs. Accordingly, the time length of the superframe 100 is 1,400,000/3 µs (14/30 s). The transmitting device according to an exemplary embodiment of the present invention may divide the video of 30 frames per second (fps) by 14 frames and transmit the same by use of the superframe 100 with the time length of 14/30 s. That is, the time length of the superframe 100 shown in FIG. 3 corresponds to the time length of the video 300 of 30 fps divided by 14 frames. In this instance, a bandwidth may be 6 MHz, a size of the fast Fourier transform (FFT) may be 32 k, and a guard interval (GI) may be 1/128.

Figure 4:
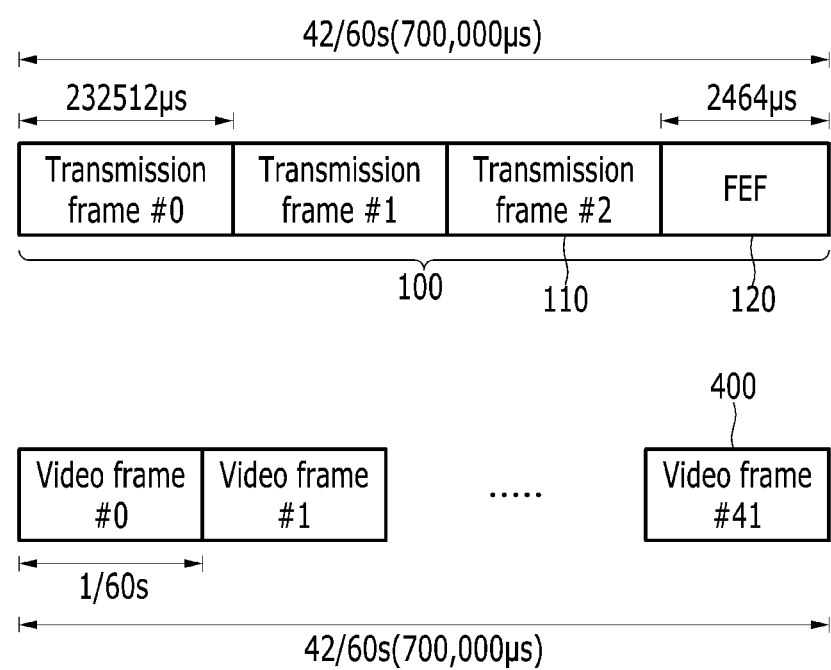
FIG. 4 shows a superframe according to another exemplary embodiment of the present invention, and media data synchronized to the superframe.

FIG. 4 shows a superframe according to another exemplary embodiment of the present invention, and media data synchronized to the superframe.

Referring to FIG. 4, the transmission frame 110 included in the superframe 100 includes 122 OFDM symbols, one superframe 100 includes three transmission frames 110, and the time length of each transmission frame 110 is 232,512 µs. The time length of the FEF 120 included in the superframe 100 is 2,464 µs. Therefore, the time length of the superframe 100 is 700,000 µs (42/60 s). A transmitting device according to another exemplary embodiment of the present invention may divide the video of 60 fps by 42 frames and may transmit the same by use of the superframe 100 with the time length of 42/60 s. That is, the time length of the superframe 100 shown in FIG. 4 corresponds to the time length of the video 400 of 60 fps divided by 42 frames. Here, the bandwidth may be 8 MHz, the size of the FFT may be 16 k, and the GI may be 1/16.

Figure 5:
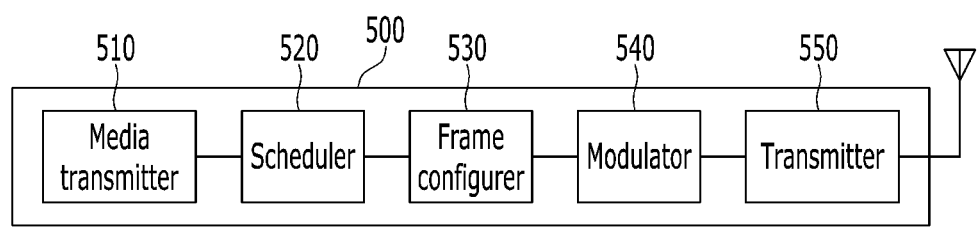
FIG. 5 shows a transmitting device according to an exemplary embodiment of the present invention.

FIG. 5 shows a transmitting device according to an exemplary embodiment of the present invention.

Referring to FIG. 5, the transmitting device 500 according to an exemplary embodiment of the present invention includes a media transmitter 510, a scheduler 520, a frame configurer 530, a modulator 540, and a transmitter 550.

The media transmitter 510 may divide the media data according to a predetermined standard by a request of the scheduler 520, and transmit the divided media data to the scheduler 520.

The scheduler 520 may request the divided media data from the media transmitter, and may configure media data to be loaded on the transmission frame 110 according to the time interval of the transmission frame 110. The scheduler 520 transmits the configured media data to the frame configurer 530 together with signaling information on a predetermined time interval (e.g., a time length of the divided media data or a time length of the transmission frame).

The frame configurer 530 may configure the superframe 100 by loading the media data configured by the scheduler 520 on the transmission frame 110. That is, the frame configurer 530 may allocate the media data to the transmission frame 110 based upon the time length of the media data that are divided into a plurality of portions.

The modulator 540 may modulate the superframe 100 configured by the frame configurer 530 according to a predetermined modulation scheme.

The transmitter 550 may transmit the modulated superframe 100 in a wireless manner.

Figure 6:
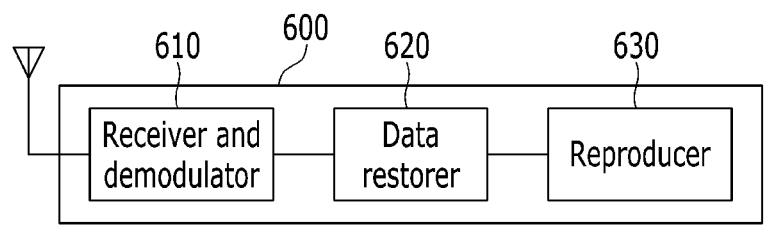
FIG. 6 shows a receiving device according to an exemplary embodiment of the present invention.

FIG. 6 shows a receiving device according to an exemplary embodiment of the present invention.

Referring to FIG. 6, the receiving device 600 according to an exemplary embodiment of the present invention includes a receiver and demodulator 610, a data restorer 620, and a reproducer 630.

The receiver and demodulator 610 may receive the transmission frame 110 from the transmitting device 600 and may demodulate the same. The demodulated transmission frame 110 is transmitted to the data restorer 620.

The data restorer 620 may extract media data from the demodulated transmission frame 110. Here, the data restorer 620 may refer to signaling information indicating the time interval of the divided media data to restore the media data that have a predetermined time interval in the demodulated transmission frame 110.

The reproducer 630 may demodulate the restored media data and may reproduce the same.

Figure 7:
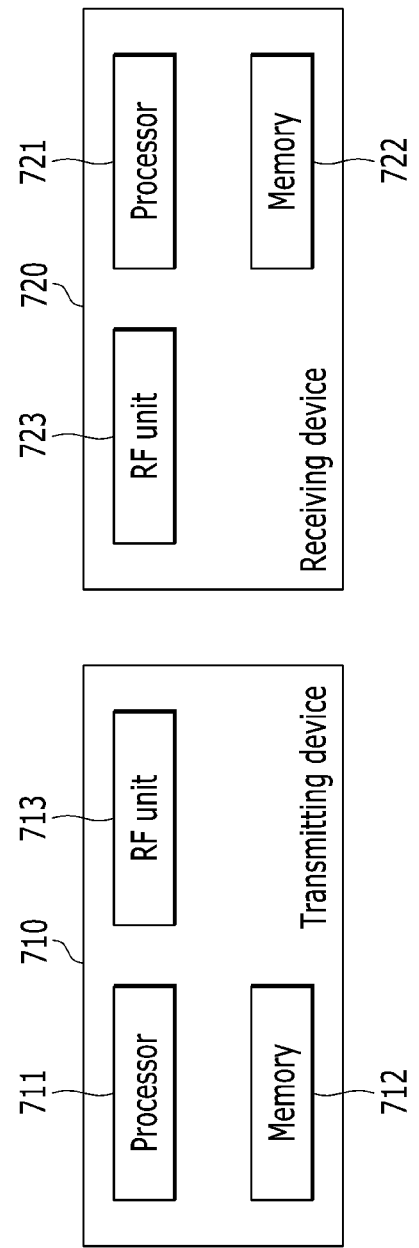
FIG. 7 shows a digital broadcasting system according to an exemplary embodiment of the present invention.

FIG. 7 shows a digital broadcasting system according to an exemplary embodiment of the present invention.

Referring to FIG. 7, the digital broadcasting system 700 according to an exemplary embodiment of the present invention includes a transmitting device 710 and a receiving device 720.

The transmitting device 710 includes at least one processor 711, a memory 712, and a radio frequency (RF) unit 713. The memory 712 may be connected to the processor 711 to store various kinds of information for driving the processor 711. The radio frequency (RF) unit 713 may be connected to the processor 711 to transmit and receive a radio signal generated by the processor 711. The processor 711 may realize a function, a process, or a method proposed by an exemplary embodiment of the present invention. In this instance, a wireless interface protocol layer may be realized by the processor 711 in a wireless communication system according to an exemplary embodiment of the present invention. An operation of the transmitting device 710 according to an exemplary embodiment of the present invention may be realized by the processor 711.

The receiving device 720 according to an exemplary embodiment of the present invention includes at least one processor 721, a memory 722, and a radio frequency (RF) unit 723. The memory 722 may be connected to the processor 721 to store various sorts of information for driving the processor 721. The radio frequency (RF) unit 723 may be connected to the processor 721 to transmit and receive the radio signal generated by the processor 721. The processor 721 may realize a function, a process, or a method proposed by an exemplary embodiment of the present invention. In this instance, a wireless interface protocol layer may be realized by the processor 721 in a wireless communication system according to an exemplary embodiment of the present invention. An operation of the receiving device 720 according to an exemplary embodiment of the present invention may be realized by the processor 721.

In an exemplary embodiment of the present invention, the memory may be provided inside or outside the processor, and the memory may be connected to the processor by using various means known to a person skilled in the art. The memory is a volatile or non-volatile storage medium in various formats, and for example, the memory may include a read-only memory (ROM) or a random access memory (RAM).

According to an exemplary embodiment of the present invention, performing scheduling for loading media data on a transmission frame, controlling a buffer of the transmitting/receiving device, and synchronizing reproduction of media by synchronizing the time length of the superframe and the time length of the media data may be easily realized.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for transmitting media data in a digital broadcasting system, comprising:

dividing the media data into at least one partial media data;

allocating the at least one partial media data to at least one transmission frame included in a superframe;

configuring the at least one transmission frame and a future extension frame (FEF) as the superframe, so that a summation of a time length of the at least one transmission frame and a time length of the FEF corresponds to the time length of the media data; and transmitting the superframe to which the media data are allocated, wherein the media data are not loaded on the FEF and the media data are loaded on the at least one transmission frame.

2. The method of claim 1, wherein the superframe includes two transmission frames, and the media data are video data of 30 frames per second (fps).

3. The method of claim 1, wherein the superframe includes three transmission frames, and the media data are video data of 60 frames per second (fps).

4. A device for transmitting media data in a digital broadcasting system, comprising:

a frame configurer for dividing the media data into at least one partial media data, allocating the at least one partial media data to at least one transmission frame included in a superframe, and configuring the at least one transmission frame and a future extension frame (FEF) as the superframe, so that a summation of a time length of the at least one transmission frame and a time length of the FEF corresponds to the time length of the media data; and a transmitter for transmitting the superframe to which the media data are allocated, wherein the media data are not loaded on the FEF and the media data are loaded on the at least one transmission frame.

5. The device of claim 4, wherein the superframe includes two transmission frames, and the media data are video data of thirty frames per second (fps).

6. The device of claim 4, wherein the superframe includes three transmission frames, and the media data are video data of sixty frames per second (fps).

7. A device for transmitting media data, comprising:

at least one processor;

a memory; and a radio frequency (RF) unit, wherein the at least one processor performs at least one program included in the memory to:

divide the media data into at least one partial media data;

allocate the at least one partial media data to at least one transmission frame included in a superframe;

configure the at least one transmission frame and a future extension frame (FEF) as the superframe, so that a summation of a time length of the at least one transmission frame and a time length of the FEF corresponds to the time length of the media data; and transmit the superframe to which the media data are allocated, wherein the media data are not loaded on the FEF and the media data are loaded on the at least one transmission frame.

8. The device of claim 7, wherein the superframe includes two transmission frames, and the media data are video data of thirty frames per second (fps).

9. The device of claim 7, wherein the superframe includes three transmission frame, and the media data are video data of sixty frames per second (fps).

* * * * *